D. E. LYONS.
ROLLER BEARING.
APPLICATION FILED DEC. 30, 1911.
1,051,141. Patented Jan. 21, 1913.
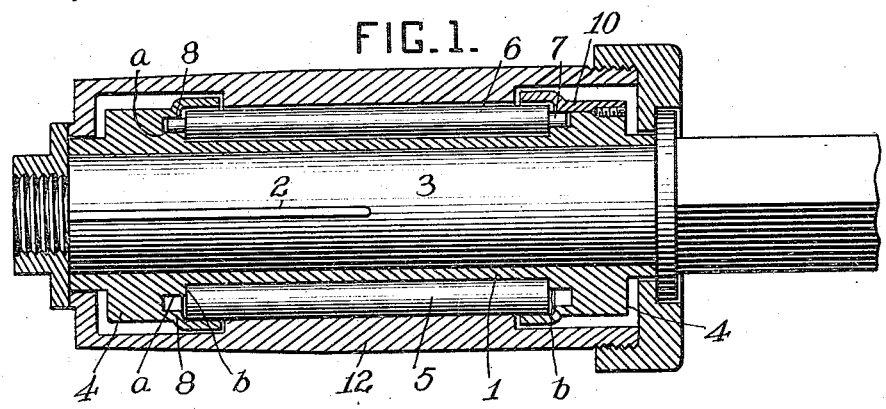
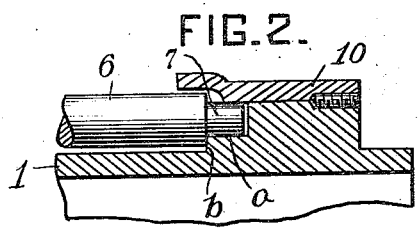
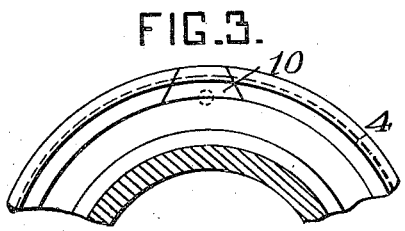
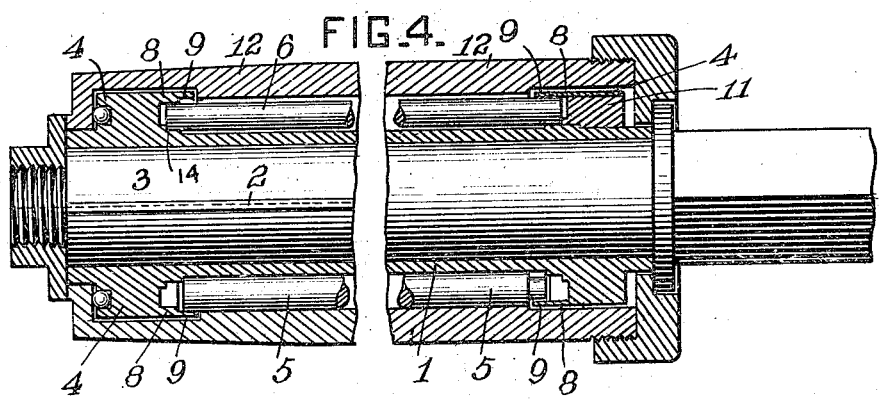
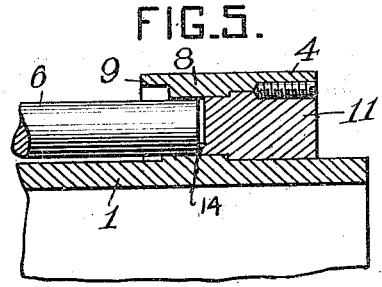
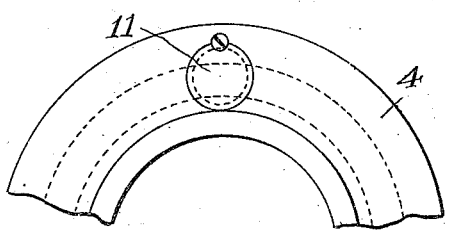
WITNESSES:
J. Herbert Bradley.
Thomas Joyce
INVENTOR
David E. Lyons
by Dennis D. Wolcott Atty

UNITED STATES PATENT OFFICE.

DAVID E. LYONS, OF LOS ANGELES, CALIFORNIA, ASSIGNOR TO DARWIN S. WOLCOTT, TRUSTEE, OF SEWICKLEY, PENNSYLVANIA.

ROLLER-BEARING.

1,051,141.

Specification of Letters Patent.  Patented Jan. 21, 1913.

Application filed December 30, 1911.  Serial No. 668,745.

*To all whom it may concern:*

Be it known that I, DAVID E. LYONS, residing at Los Angeles, in the county of Los Angeles and State of California, a citizen of the United States, have invented or discovered certain new and useful Improvements in Roller-Bearings, of which improvements the following is a specification.

The invention described herein relates to certain improvements in the type or form of roller bearing described and claimed in application Serial No. 668,744 filed December 30th 1911, and is hereinafter more fully described and claimed.

In the accompanying drawing forming a part of this specification Figure 1 is a sectional elevation of my improved bearing, Fig. 2 is a sectional view on an enlarged scale of a portion of the construction shown in Fig. 1; Fig. 3 is an end view of the portion shown in Fig. 2; Fig. 4 shows views similar to Fig. 1 illustrating certain modifications of my improvement; Figs. 5 and 6 are sectional and end views on an enlarged scale of a portion of the construction shown in Fig. 4.

In the practice of my invention it is preferred that the inner bearing or working surface should be formed on a sleeve or shell 1, which can be secured in any suitable manner as by a key 2 to an axle, shaft, or supporting member 3. This working or bearing surface has formed integral therewith suitably spaced collars 4, the number of such collars being dependent on the number of series of rollers employed, and the spacing between adjacent collars being dependent on the length of working rollers 5 employed. Spacing rollers 6 having a diameter less than that of the working rollers are arranged intermediate of the working rollers. As the spacing rollers should be supported with their axes the same distance as the axes of the working rollers from the axis of the sleeve 1 and therefore out of contact with the inner working or bearing surface, the spacing rollers are provided at their ends with journal portions 7, which may be of less diameter than the bodies of the rollers 6 as shown in Figs. 1, 2 and 3 or may be of the same diameter as the bodies of the rollers as shown in Fig. 4. These journal portions rest upon and roll along peripheral bearing surfaces $a$ formed by grooving the inner walls of the collars 4. The height of these bearing surfaces $a$ relative to the surface of the sleeve 1 should be sufficient to support the spacing rollers with their axes the same distance from the surface of sleeves as the axes of the working or bearing rollers 5, and hence, as the bodies of the spacing rollers have a smaller diameter than those of the working rollers, the former will not contact with a surface of the sleeve. The inner ends $b$ of the portions $a$ forming the peripheral bearing for the spacing rollers, serve as abutments or bearings for the ends of the working rollers, and also for the ends of the bodies of the spacing rollers, when the latter are formed with reduced journal portions 7. It will be observed that contact surfaces between the ends of the rollers and the abutment $b$ have areas considerably less than the areas of the ends of the rollers, and hence no material heating will be effected by the friction between the rollers and the abutments.

In grooving the inner ends of the collars 4 an overhanging flange or ring 8 is formed, which will extend above the journal portions 7 of the spacing rollers and retain the latter in position. This flange or ring 8 should be cut back or made shorter than the portions $a$ so that the ends of the rollers may not contact therewith. If desired these retaining rings or flanges 8 may be formed with extensions 9 constructed to slightly overlap the ends of the working rollers 5 and retain them in position.

In order to permit of the placing the spacing rollers in position one of the collars is provided with a removable section. In the construction shown in Figs. 1, 2 and 3 a notch or recess is cut in the periphery of one of the collars, said recess extending through the ring 8 and also the extension 9, when the latter construction is employed, at one end the ends of the rollers are placed in position and the opposite ends dropped through the recess onto the surface $a$. After all the rollers have been placed in position, a block 10 is placed and locked in the recess. In the construction shown in Figs. 4, 5 and 6 an opening is formed through one of the collars in line with the groove or raceway. In this construction the rollers are passed longitudinally through the opening, which is then closed by a plug 11. In the construction shown in Figs. 1, 2 and having the collars so spaced and constructed that the working rollers can be placed in position laterally, the recess in or opening through the collar is made only large enough to permit of the free passage of the spacing rollers. When the flange or retaining ring is provided with an extension to hold the working rollers in position, the recess in or opening through the collar should be made sufficiently large to permit of the passage of the working rollers. After the rollers have been placed in position a plug 10 is inserted and locked in position. In order to insure the proper placing of the block or plug the inner end of the latter being made to form a continuation of the walls of the groove, shoulders are formed on the walls of the opening and plug respectively.

When the collars 4 are formed with extensions 9 of the ring 8 for holding the working rollers in position, two constructions or forms may be adopted. One in which the rollers are of uniform diameter throughout as shown to the left in Fig. 4, and the other having the ends of the working rollers recessed peripherally for the reception of the extension as shown to the right in Fig. 4. When the first construction is employed, the collar or at least portions thereof must necessarily be increased in diameter, and the outer shell 12 recessed adjacent to its ends for the reception of the enlarged collars. Hence the outer shell is made in two longitudinal sections as indicated by a dotted line at the left of Fig. 4, in order that it may be placed in position. When the working rollers have their ends recessed, no recessing of the outer shell 12 is necessary, as the shell may be slipped longitudinally over the collars, as is shown to the right in Fig. 4.

In order to provide suitable end bearings for the spacing rollers, when the latter are made of uniform diameter throughout or with unreduced journal portions, peripheral shoulders 14 are formed in the grooves or raceways, said shoulders being made of such height relative to the diameters of the spacing rollers, that the area of contact of each roller with said shoulder will be less than half the area of the end of the roller.

As is well known, the rollers in roller bearings for vehicles, will in use tend to move longitudinally and will therefore exert very considerable pressure against the collars, between which the rollers are arranged and difficulty has been experienced in securing the collars to withstand such thrusts. In the improved construction, the collars are made integral with the surface over which the working rollers move, thereby insuring maintenance of the collars in proper relation to each other. As hereinbefore stated, the working rollers being of a length equal to the distance between the shoulders $b$ which is less than the distance between the inner edges of the flanges or retaining rings 8, the making of the collars integral with the working or bearing surface, will not prevent the placing of the working rollers in position. But as the spacing rollers are longer than the distance between the inner edges of the flange or ring 8, provision must be made for the placing of the spacing rollers with their ends in the grooves on the collars. To this end one of the collars is formed with a removable section, as has been stated. When the bearing is constructed, as shown in Fig. 4, and also in Fig. 5, i. e., with an extension on the flange or ring 8 to overlap the ends of the working rolls, and hold them in position, the removable portion of the collar is made sufficiently large to permit of the insertion of the working rollers, as well as the spacing rollers.

It is characteristic of my improvement that the bearing consists of a minimum number of parts, and the structure is such as to obtain the maximum strength and resistance to strains.

I claim herein as my invention:

1. In a roller bearing, the combination of a member having a cylindrical bearing surface having formed thereon peripheral raised portions spaced a suitable distance apart, working rollers arranged around said member and intermediate the peripheral raised portions, spacing rollers arranged intermediate the working rollers and having their ends supported by the peripheral raised portions, and collars formed integral with said member and having formed thereon flanges extending inwardly over the ends of the working rollers, and adapted to retain the spacing and working rollers in position, one of the collars having a removable section to permit of the placing of the rollers in position.

2. In a roller bearing, the combination of a member having a cylindrical bearing surface having formed thereon peripheral raised portions spaced a suitable distance apart, working rollers arranged around said member and intermediate the peripheral raised portions, spacing rollers arranged intermediate the working rollers and having their ends supported by the peripheral raised portions, collars formed integral with said member and having formed thereon flanges extending inwardly over the ends of the working rollers, and adapted to retain the spacing and working rollers in position, one of said collars having a peripheral recess, and a block adapted to be secured to said recess and having a portion adapted to form a continuation of the flange on the collar.

In testimony whereof, I have hereunto set my hand.

DAVID E. LYONS.

Witnesses:
G. G. TRILL,
ALICE A. TRILL.

Copies of this patent may be obtained for five cents each, by addressing the "Commissioner of Patents, Washington, D. C."